Patented Nov. 28, 1950

2,532,048

UNITED STATES PATENT OFFICE 2,532,048

ALPHA-CYANO GLUTARALDEHYDIC ACIDS

Donald T. Warner and Owen A. Moe, Minneapolis, Minn., assignors to General Mills, Inc., a corporation of Delaware No Drawing. Application November 6, 1948, Serial No. 58,819

8 Claims. (Cl. 260—465.4)

The present invention relates to various intermediate aldehyde compounds which are particularly useful in various organic syntheses. The aldehydes contemplated by the present invention may be represented by the following structural formula

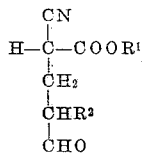

in which $R^1$ is a low alkyl group containing from one to four carbon atoms, and $R^2$ is selected from the group consisting of hydrogen and methyl.

The aldehyde compounds of the present invention are useful in numerous ways. In view of the high functionality of the molecule, it is possible for them to enter into many typical organic reactions and thus serve as useful intermediates in further organic syntheses.

It is, therefore, an object of the present invention to provide novel aldehyde compounds having the above general formula.

It is a further object of the present invention to provide a novel process for producing such compounds.

These aldehydes may be prepared by the 1,4 addition of cyanoacetic esters to alpha,beta-unsaturated aldehydes such as acrolein and methacrolein, which results in the direct production of the desired aldehyde. These reactions are carried out in the presence of an alkaline catalyst such as alkali metal alkoxides. In general, best yields of the aldehyde compounds are obtained when the amount of catalyst is held within the approximate range of 0.001 to 0.10 mole per mole of cyanoacetic ester. Amounts of catalyst outside this range have some tendency for the production of 1,2 addition compounds and for the production of di-addition compounds of the 1,4 type.

The temperature employed during the addition reaction is likewise subject to change depending upon other conditions. Generally, however, a temperature of 0–10° C. is desirable. Temperatures in excess of 10° C. tend to produce side reactions which have an adverse effect upon yield.

The reaction is carried out in the presence of a suitable solvent diluent which does not enter into the reaction. Almost any solvent diluent which meets this test can be employed. Suitable solvents include alcohols such as ethanol, ethers such as diethyl ether, and hydrocarbon solvents such as benzene. The amount of solvent employed may be varied considerably. Usually, however, it is desired to employ quite a large excess of diluent in order to minimize side reactions. Usually a quantity of solvent several times that of the cyanoacetic ester employed is desirable.

In carrying out the reaction it is preferred to prepared a solution of the cyanoacetic ester in the solvent and to add the catalyst to this solution. The resultant solution is then cooled to a suitable temperature, depending upon the temperature at which it is desired to carry out the reaction. The unsaturated aldehyde is then added slowly to this solution over an extended period of time. In this way it is possible to control the temperature of the reaction mixture very readily to approximately the desired range and thus to control the reaction in the desired direction. After the reaction has been completed, the catalyst may be neutralized and the product worked up in a conventional manner.

The reaction is applicable to such alpha,beta-unsaturated aldehydes as acrolein and methacrolein. The alcoholic group of the cyanoacetic ester may be either methyl, ethyl, propyl, or butyl.

The following examples will serve to illustrate the invention:

Example 1

Ethyl cyanoacetate (22.6 g.) was dissolved in 115 cc. of absolute ethanol containing 0.07 g. of sodium. The reaction mixture was cooled to 0° C. and methacrolein (14.2 g.) was added dropwise. The temperature increased to +7° C. The reaction mixture was stirred for an additional 4 hour period at 3–5° C. After neutralization, the ethanol was removed in vacuo and the residual oil was dissolved in 100 cc. of benzene. The benzene solution was washed with three 200 cc. portions of water. After drying, the benzene was removed in vacuo and the residual aldehydo compound was distilled. The desired fraction was collected at 94–104° C. (0.4–0.45 mm.). When this product was mixed with 2,4-dinitrophenylhydrazine in a conventional manner, the 2,4-dinitrophenylhydrazone was obtained melting at 100–112° C. Purification by recrystallization from ethanol yielded the 2,4-dinitrophenylhydrazone of gamma-cyano-gamma-carbethoxy-alpha-methylbutyraldehyde melting at 112–113.5° C.

Calc. for $C_{15}H_{17}O_6N_5$: C, 49.59; H, 4.65. Found: C, 49.38; H, 4.41.

Example 2

An alcoholic solution consisting of 200 parts of absolute ethanol and 0.04 part of metallic sodium and 45.5 parts of ethyl cyanoacetate was cooled to 0° C. Acrolein (23.3 parts) was added dropwise over a period of 75 minutes and the temperature was maintained at 0–3° C. The reaction mixture was stirred for an additional four hour period and then placed in the refrigerator overnight. The alkaline catalyst was neutralized by the addition of 0.75 part of glacial acetic acid. After neutralization, the solution was concentrated in vacuo. The viscous oil thus obtained was dissolved in benzene and the benzene solution was concentrated in vacuo. The residual oil was subjected to fractional distillation under diminished pressure. The desired product was collected at 103–120° C. at 1.0 mm. This product was redistilled to yield the following fractions. Fraction (1) was collected at 47–82° C. at 0.08 mm., $n_D^{25}$ 1.4228, and fraction (2) was collected at 82° C. at 0.08 mm., $n_D^{25}$ 1.4430. Fraction (3) was collected at 82°–84° C. at 0.08 mm., $n_D^{25}$ 1.4464, and fraction (4) was collected at 84–87° C. at 0.08 mm., $n_D^{25}$ 1.4482. Fraction (1) proved to be mostly ethyl cyanoacetate, whereas fractions 2, 3 and 4 contained mostly gamma-carbethoxy-gamma-cyano-butyraldehyde. The 2,4-dinitrophenylhydrazone was prepared in the usual manner and melted at 111.5 to 112° C. after purification by crystallization from aqueous alcohol.

As has been indicated previously, the various aldehyde compounds of the present invention are useful in further syntheses in view of the high functionality of the molecule. For example, they are useful in the synthesis of biotin and substituted biotins in accordance with the following generally indicated synthesis. The product of this reaction may be converted to biotin and substituted biotins in accordance with known reactions.

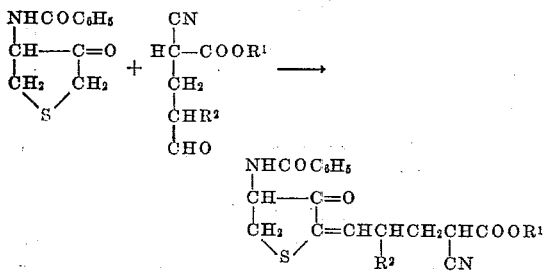

Aldehyde compounds of the present invention are also useful in the synthesis of pimelic and more particularly substituted pimelic acids, and also in the synthesis of hydantoins in accordance with the following series of reactions.

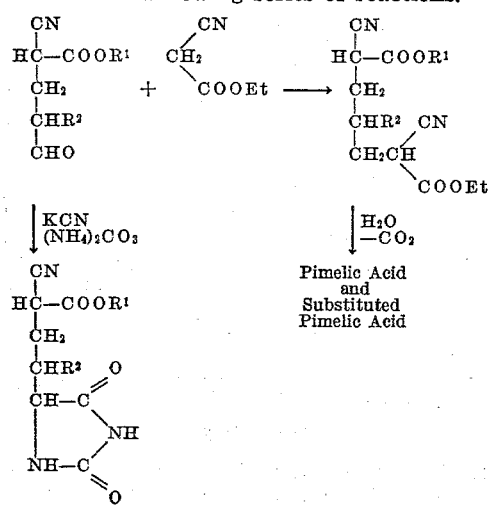

These compounds are also useful in the synthesis of beta-(3-indole)-propionic acids in accordance with the following reaction:

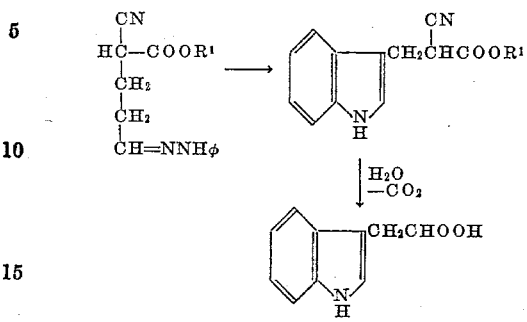

These aldehydes may also be used for the synthesis of amino acids by reacting them with HCN which reacts with the aldehyde group to form the cyanhydrin. This compound then may be reacted with ammonia to convert the hydroxyl group to an amino group, after which the resultant compound may be subjected to hydrolysis and decarboxylation to produce various amino acids.

The present application is a continuation-in-part of our copending application, Serial No. 714,645, filed December 6, 1946, entitled Aldehydes, now abandoned.

While various modifications of the invention have been described, it is to be understood that other variations are possible without departing from the spirit thereof.

We claim as our invention:

1. Aldehyde compounds having the following formula

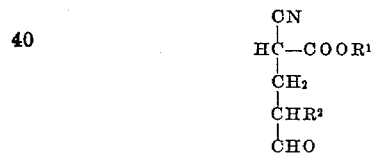

in which $R^1$ is an alkyl group containing from one to four carbon atoms, and $R^2$ is selected from the group consisting of hydrogen and methyl.

2. Aldehyde compounds having the following formula

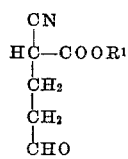

in which $R^1$ is an alkyl group containing from one to four carbon atoms.

3. Aldehyde compounds having the following formula

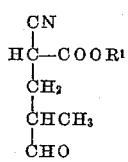

in which $R^1$ is an alkyl group containing from one to four carbon atoms.

4. Gamma - cyano - gamma - carbethoxybutyraldehyde.

5. Gamma - cyano - gamma - carbethoxy-alpha-methylbutyraldehyde.

6. Process of preparing aldehydes having the following formula

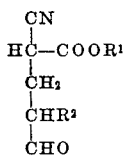

in which R¹ is an alkyl group containing from one to four carbon atoms, and R² is selected from the group consisting of hydrogen and methyl, which comprises reacting a cyanoacetic ester with an alpha, beta-unsaturated aldehyde selected from the group consisting of acrolein and methacrolein, in the presence of an alkaline condensation catalyst and in the presence of an organic solvent diluent.

7. Process of preparing aldehyde compounds having the following formula

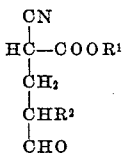

in which R¹ is an alkyl group containing from one to four carbon atoms, and R² is selected from the group consisting of hydrogen and methyl, which comprises preparing a solution of a cyanoacetic ester in an organic solvent diluent containing an alkaline condensation catalyst in the approximate molar ratio of 0.001 to 0.1 based on the cyanoacetic ester, gradually adding thereto an alpha, beta-unsaturated aldehyde selected from the group consisting of acrolein and methacrolein, and maintaining the temperature of the reaction mixture not in excess of 10° C.

8. Process according to claim 7 in which the alkaline condensation catalyst is an alkali metal alkoxide.

DONALD T. WARNER.
OWEN A. MOE.

REFERENCES CITED

The following references are of record in the file of this patent:

UNITED STATES PATENTS

| Number | Name | Date |
|---|---|---|
| 2,093,519 | Hamann | Sept. 21, 1937 |

OTHER REFERENCES

De Bollemont: Beilstein (Handbuch, 4th ed.), vol. 3, p. 788 (1921).

Perkin: Beilstein (Handbuch, 4th ed.), vol. 3, p. 799 (1921).